(12) United States Patent
Shibasaki (10) Patent No.: US 8,408,719 B2
(45) Date of Patent: Apr. 2, 2013

(54) PROJECTION APPARATUS AND PROJECTION METHOD

(75) Inventor: Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 412 days.

(21) Appl. No.: 12/556,862

(22) Filed: Sep. 10, 2009

(65) Prior Publication Data

US 2010/0079730 A1 Apr. 1, 2010

(30) Foreign Application Priority Data

Sep. 26, 2008 (JP) ................................. 2008-248168
Jul. 2, 2009 (JP) ................................. 2009-157929

(51) Int. Cl.
*G03B 21/20* (2006.01)
*G03B 21/26* (2006.01)
*G09G 3/32* (2006.01)

(52) U.S. Cl. ................. 353/94; 353/85; 345/82; 345/83

(58) Field of Classification Search .................... 353/94, 353/30–31, 85; 345/82–83, 207, 613, 694; 348/742, 801

See application file for complete search history.

(56) References Cited

U.S. PATENT DOCUMENTS

| | | | |
|---|---|---|---|
| 6,547,400 B1 | 4/2003 | Yokoyama | |
| 7,019,736 B2 * | 3/2006 | Allen et al. | 345/207 |
| 7,052,138 B2 * | 5/2006 | Matsui | 353/31 |
| 7,607,784 B2 * | 10/2009 | Shimaoka et al. | 353/85 |
| 7,969,640 B2 * | 6/2011 | Arai et al. | 359/290 |
| 8,021,001 B2 * | 9/2011 | Iwanaga | 353/85 |
| 2003/0147055 A1 | 8/2003 | Yokoyama | |
| 2004/0036668 A1 | 2/2004 | Nakanishi | |
| 2004/0041744 A1 | 3/2004 | Inoue et al. | |
| 2005/0041000 A1 | 2/2005 | Plut | |
| 2005/0207157 A1 | 9/2005 | Tani | |
| 2006/0215124 A1 | 9/2006 | Seo | |
| 2007/0046898 A1 | 3/2007 | Conner | |
| 2007/0070296 A1 | 3/2007 | Iwanaga | |
| 2007/0153866 A1 | 7/2007 | Shchegrov et al. | |
| 2009/0096741 A1 | 4/2009 | Kim | |

FOREIGN PATENT DOCUMENTS

| | | |
|---|---|---|
| EP | 1 662 804 A1 | 5/2006 |
| EP | 2 048 648 A2 | 4/2009 |
| JP | 10-326080 A | 12/1998 |
| JP | 2000-112031 A | 4/2000 |
| JP | 2002-372953 A | 12/2002 |

(Continued)

OTHER PUBLICATIONS

Partial European Search Report dated Feb. 1, 2010 (in English) issued in a counterpart Europea Application No. 09170003.9-1241.
Japanese Office Action dated Jan. 25, 2011 (and English translation thereof) in counterpart Japanese Application No. 2009-157929.
Japanese Office Action dated Apr. 12, 2011 (and English translation thereof) in counterpart Japanese Application No. 2010-208658.

(Continued)

*Primary Examiner* — Tony Ko
*Assistant Examiner* — Jori S Reilly-Diakun
(74) *Attorney, Agent, or Firm* — Holtz, Holtz, Goodman & Chick, P.C.

(57) ABSTRACT

A projection apparatus projecting images of respective color components sequentially includes a light source section having a plurality of light emitting elements (where n is a natural number greater than one), and a driving control section for driving each of the light emitting elements making up the light source section, by a pulse width modulation scheme with a phase difference based on $\lambda/n$ (where $\lambda$ is a lighting period unit), in synchronism with a projection period unit of the image of each color component.

10 Claims, 10 Drawing Sheets

FOREIGN PATENT DOCUMENTS

| | | | |
|---|---|---|---|
| JP | 2005-156711 A | | 6/2005 |
| JP | 2005156711 A | * | 6/2005 |
| JP | 2005-181528 A | | 7/2005 |
| JP | 2005-181579 A | | 7/2005 |
| JP | 2006-310320 A | | 11/2006 |
| JP | 2007-094108 A | | 4/2007 |
| JP | 2007-163988 A | | 6/2007 |
| JP | 2008-198430 A | | 8/2008 |

OTHER PUBLICATIONS

Extended European Search Report dated Apr. 9, 2010 (in English) in counterpart European Application No. 09170003.9.

Japanese Office Action dated Aug. 3, 2010 (and English translation thereof) in counterpart Japanese Application No. 2009-157929.

Extended European Search Report dated Nov. 8, 2010 (in English) in counterpart European Application No. 10008057.1.

* cited by examiner

PROJECTION APPARATUS AND PROJECTION METHOD

CROSS-REFERENCE TO RELATED APPLICATIONS

This application is based upon and claims the benefit of priority from prior Japanese Patent Applications No. 2008-248168, filed Sep. 26, 2008; and No. 2009-157929, filed Jul. 2, 2009, the entire contents of both of which are incorporated herein by reference.

BACKGROUND OF THE INVENTION

1. Field of the Invention

The present invention relates to a projection apparatus, for example, a data projection apparatus, and a projection method.

2. Description of the Related Art

Techniques have been proposed which are used for a projection apparatus including light emitting diodes (LEDs) as a light source, to enable the red, green, and blue light emitting diodes to be lit and dimmed and enable the temperatures of the R, G, and B light emitting diodes to be individually controlled to appropriately and smoothly adjust and maintain the brightness and light emission efficiency of a display screen in an image display section, while allowing power consumption to be easily reduced (see, for example, Jpn. Pat. Appln. KOKAI Publication No. 2005-181528).

A method of adjusting light emission duration and a method of adjusting light emission intensity are possible for techniques for dimming the light emitting diodes, serving as a light source, including the technique described in Jpn. Pat. Appln. KOKAI Publication No. 2005-181528.

The former method of adjusting the light emission duration of the light source needs to adjust time for which images are displayed by a light modulating element such as a liquid crystal display panel, Digital Micromirror Device (DMD) (registered trade mark), or the like which forms projection images, according to the adjusted light emission duration. In particular, gradation display requires very complicated control. Consequently, this method is not practicable.

Furthermore, the latter method of adjusting the light emission intensity may involve, for example, controlling the current through each of the light emitting diodes.

Figure 9:
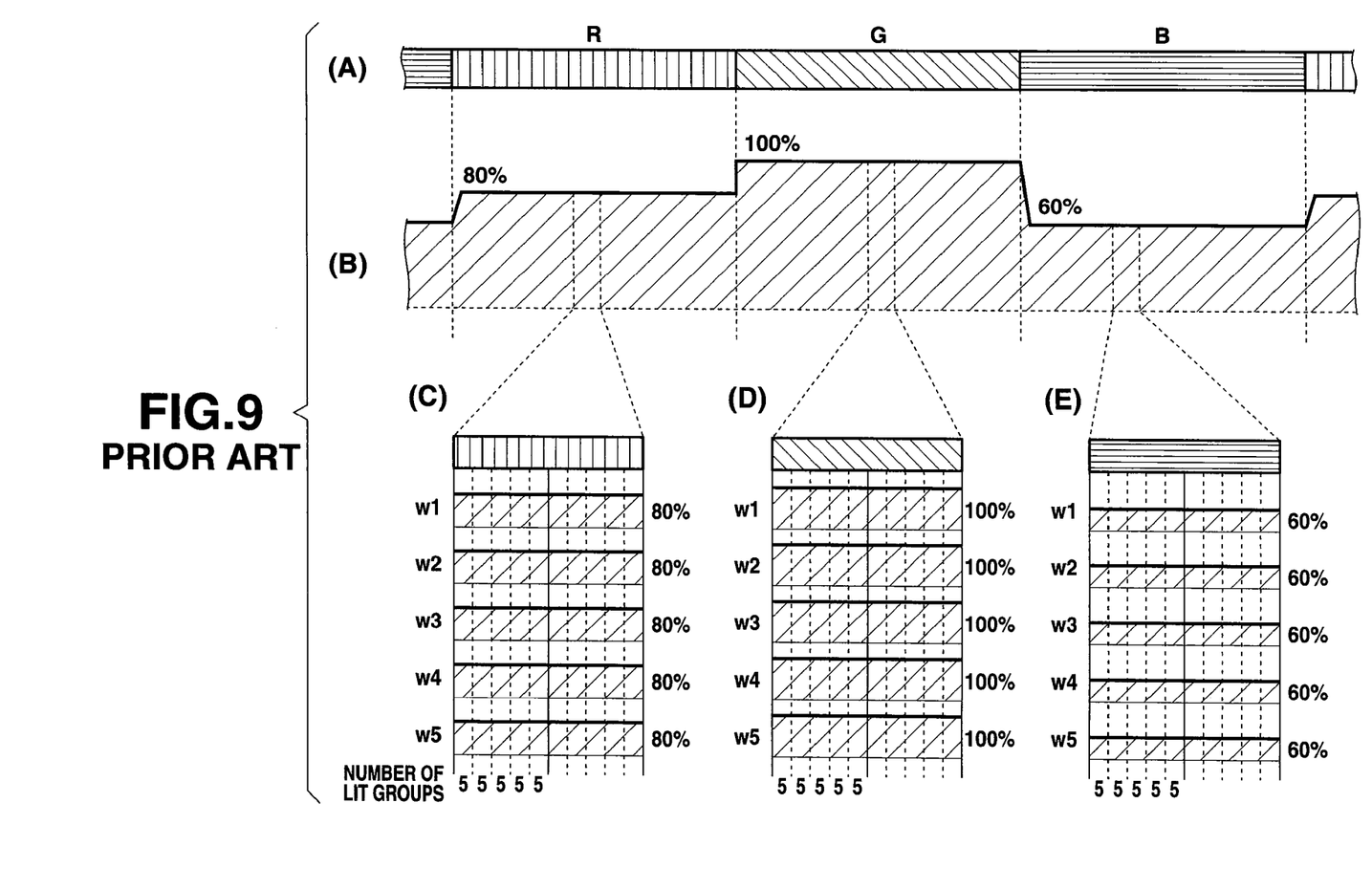
FIG. 9 is a diagram showing an example of how dimming is performed by a common sequentially driven light source.

FIG. 9 shows that a white light emitting diode group also using a color wheel is used as a light source. In this case, dimming is performed such that luminance is 80% of a rated value for projection of a red (R) image, is equal to the rated value, that is, 100% of the rated value, for projection of a green (G) image, and is 60% of the rated value for projection of a blue (B) image.

FIG. 9(A) shows projection timings for each color image. FIG. 9(B) shows the light emission intensity of the white light emitting diode group. FIGS. 9(C) to 9(E) show how the white light emitting diode group is driven for each color image. Here, for simplification of description, the white light emitting diode group is assumed to be composed of a total of five light emitting diodes w1 to w5.

As shown in FIGS. 9(C) to 9(E), when a red (R) image, a green (G) image, and a blue (B) image are projected, the driving current supplied to the light emitting diodes w1 to w5 is adjusted such that the luminance is 80%, 100%, and 60% of the rated value, respectively. All the light emitting diodes w1 to w5 are driven by a driving current of the same magnitude so as to emit light. Thus, the number of diodes simultaneously lit is always a total number, that is, "5".

As described above, if the driving current is adjusted in an analog manner, particularly when the current is reduced so as to provide a low luminance, a response time from the current state until the next desired emission luminance is obtained is disadvantageously increased.

For example, in FIG. 9(B), described above, no problem occurs when the emission luminance changes from 80% to 100%. However, both when the emission luminance changes from 60% to 80% and when the emission luminance changes from 100% to 60%, the response is delayed, thus hindering accurate gradation display.

In order to avoid a possible decrease in response speed based on the adjustment of the driving current, a method can be used which controls the number of light emitting diodes emitting light with a 100% luminance instead of adjusting the driving current for the individual light emitting diodes.

Figure 10:
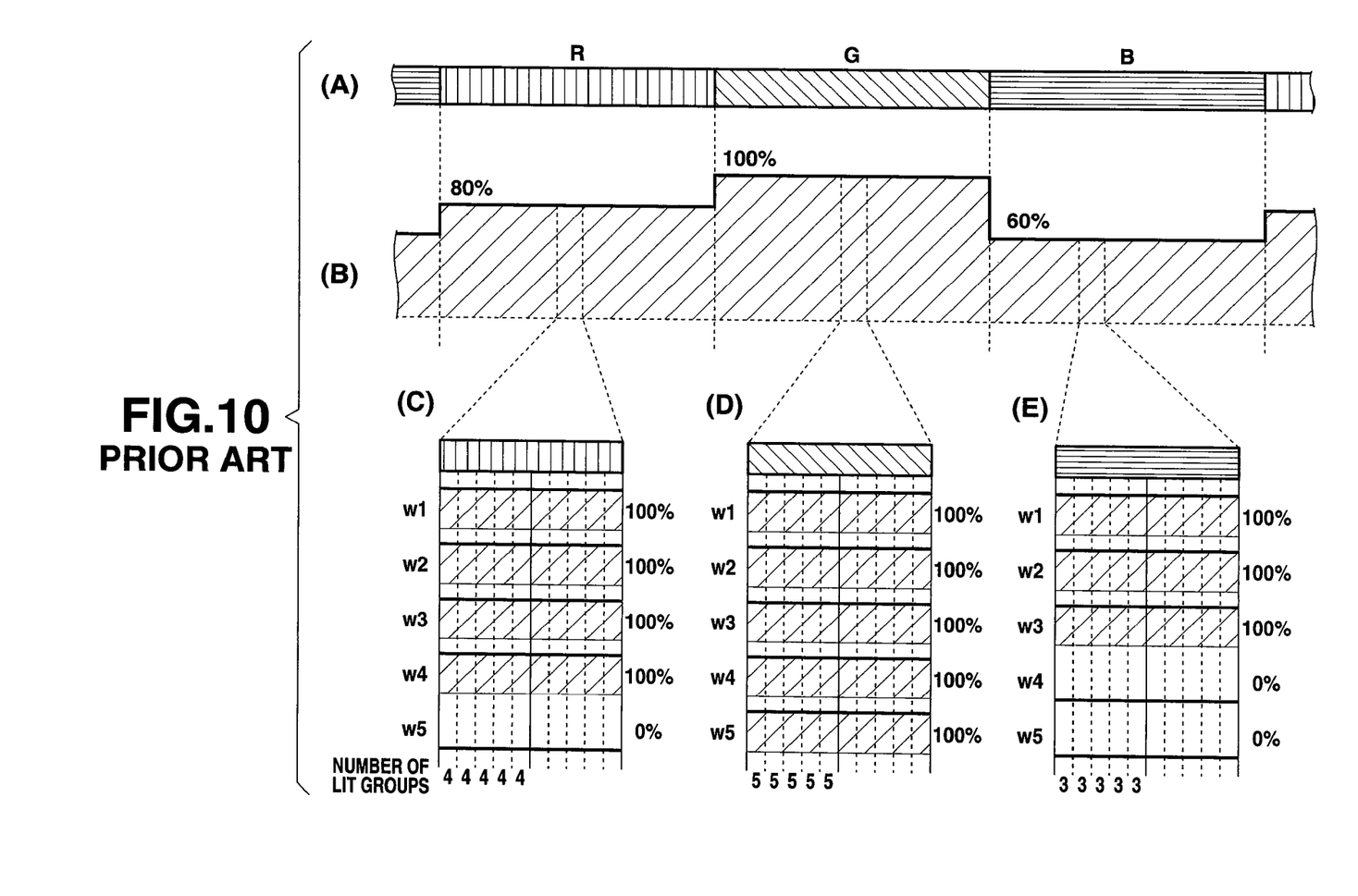
FIG. 10 is a diagram showing an example of how dimming is performed by a common sequentially driven light source.

FIG. 10 shows that a white light emitting diode group also using a color wheel is used as a light source. In this case, dimming is performed based on the number of light emitting diodes emitting light such that luminance is 80% of a rated value for projection of a red (R) image, is equal to the rated value, that is, 100% of the rated value, for projection of a green (G) image, and is 60% of the rated value for projection of a blue (B) image.

FIG. 10(A) shows projection timings for each color image. FIG. 10(B) shows the light emission intensity of the white light emitting diode group. FIGS. 10(C) to 10(E) show how the white light emitting diode group is driven for each color image. Also in this case, the white light emitting diode group is assumed to be composed of a total of five light emitting diodes w1 to w5.

As shown in FIGS. 10(C) to 10(E), when a red (R) image, a green (G) image, and a blue (B) image are projected, the number of those of the light emitting diodes w1 to w5 which emit light is adjusted such that the luminance is 80%, 100%, and 60% of the rated value, respectively.

In FIG. 10(C), to allow the white light emitting diode group as a whole to provide an 80% luminance, four of the five light emitting diodes w1 to w5, that is, the light emitting diodes w1 to w4, are driven so as to emit light with a luminance accounting for 100% of the rated value, with the remaining one light emitting diode w5 totally prevented from being driven.

In FIG. 10(D), to allow the white light emitting diode group as a whole to provide a 100% luminance, all the five light emitting diodes w1 to w5 are driven so as to emit light with a luminance accounting for 100% of the rated value.

In FIG. 10(E), to allow the white light emitting diode group as a whole to provide a 60% luminance, three of the five light emitting diodes w1 to w5, that is, the light emitting diodes w1 to w3, are driven so as to emit light with a luminance accounting for 100% of the rated value, with the remaining two light emitting diodes w4 and w5 totally prevented from being driven.

If the number of light emitting elements emitting light is adjusted to obtain the currently required luminance as described above, all the elements to emit light are driven at the rated value. This prevents a sufficient response speed from being achieved.

In contrast, the light emission duration varies among the plurality of light emitting elements making up the light source. As a result, the lifetime of the light emitting element located at the position where the element is most frequency used disadvantageously corresponds directly to the lifetime of the light source section as a whole.

BRIEF SUMMARY OF THE INVENTION

The present invention has been made in view of the above-described circumstances. An object of the present invention is to provide a projection apparatus and a projection method which enable a plurality of light emitting elements to be efficiently driven to improve the quality of projection images and increase the lifetimes of all light emitting elements.

A projection apparatus according to an aspect of the present invention comprises a light source section having a plurality (n) of light emitting elements (where n is a natural number greater than one), and driving control means for driving each of the n light emitting elements comprising the light source section, by a pulse width modulation scheme with a phase difference based on $\lambda/n$ (where $\lambda$ is the lighting period unit), in synchronism with the lighting period unit of the light source section.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Preferred embodiments for carrying out the present invention will be described below with reference to the drawings. Various limitations that are technically preferable for carrying out the present invention are imposed on the embodiments described below. In spite of the limitations, the scope of the present invention is not limited to the following embodiments and illustrated examples.

<First Embodiment>

A first embodiment in which the present invention is applied to a data projection apparatus will be described with reference to the drawings.

Figure 1:
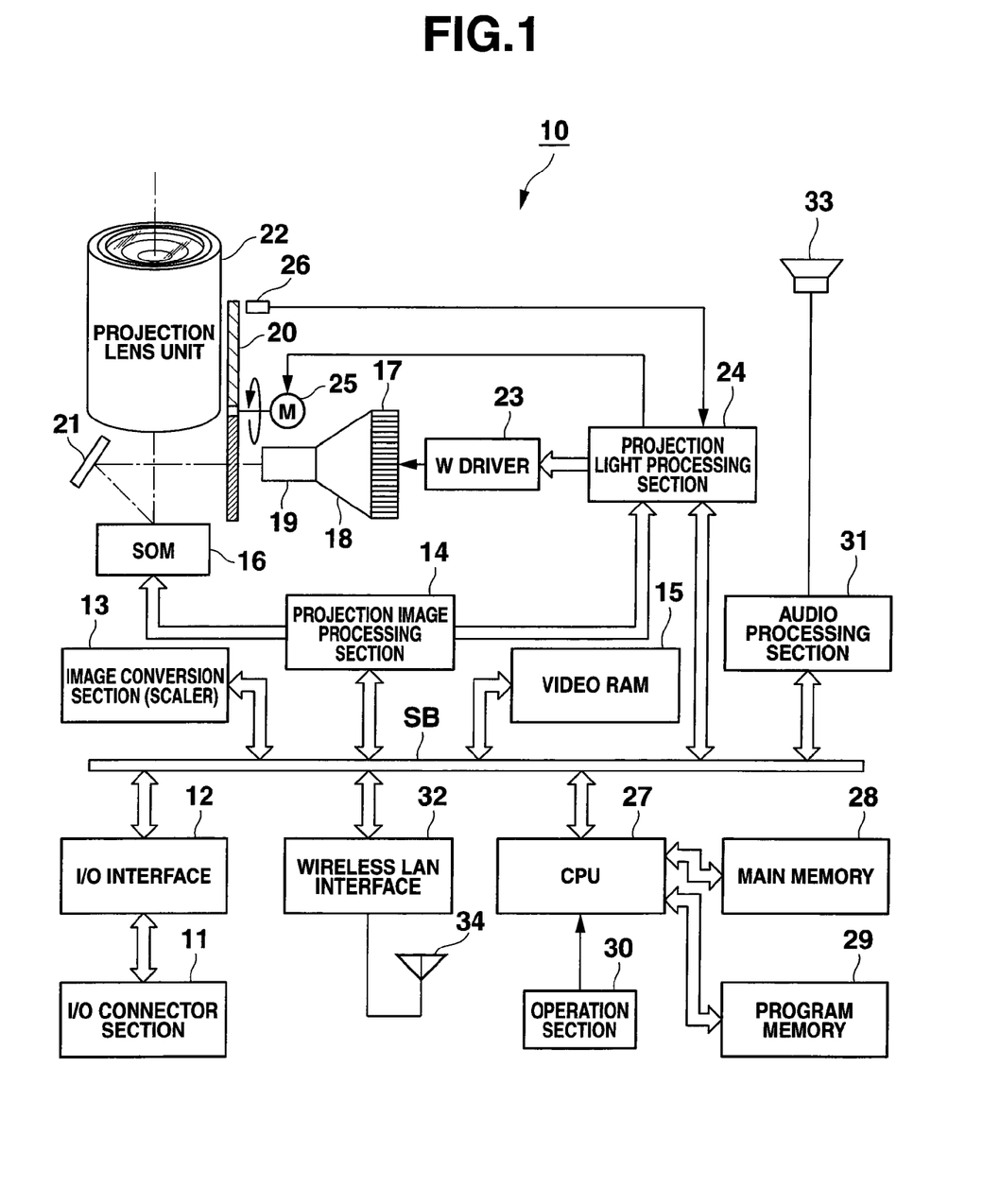
FIG. 1 is a block diagram showing a general functional configuration of an electronic circuit in a data projection apparatus according to a first embodiment of the present invention.

FIG. 1 is a block diagram showing a general functional configuration of an electronic circuit provided in a data projection apparatus 10 according to the present embodiment.

An I/O connector section 11 includes, for example, a pin jack (RCA) video input terminal, a D-sub15 type RGB input terminal, and a Universal Serial Bus (USB) connector.

An image signal in conformity with various standards is input through the I/O connector section 11. The image signal is then input to an image conversion section 13 also called a scaler, via an I/O interface 12 and a system bus SB. The image conversion section 13 converts the image signal into a predetermined format suitable for projection. The image conversion section 13 then appropriately stores the resulting image signal in a video RAM 14 that is a buffer memory for display and then transmits the signal to a projection image processing section 15.

At this time, the image conversion section 13 additionally processes the image signal as required by superimposing data such as symbols which indicate various operational states for on screen display (OSD), on the image signal. The image conversion section 13 transmits the processed image signal to the projection image processing section 15.

In accordance with the transmitted image signal, the projection image processing section 15 multiplies a frame rate according to the predetermined format, for example, 30 frames per second, the division number of color components, and the number of display gray levels together to perform faster sequential driving. The projection image processing section 15 thus drives a micromirror element 16 that is a spatial optical modulation (SOM) element so that the element 16 displays the image.

The micromirror element 16 performs an individual, quick on/off operation on the inclination of each of a plurality of arrayed micromirrors corresponding to, for example, XGA (1,024×768 pixels) so that reflected light from the micromirrors form a light image.

On the other hand, a LED array 17 is composed of a large number of regularly arrayed LEDs emitting white light with a high luminance. Light emitted by the LED array 17 is focused by a pyramidal housing 18 and changed to a luminous flux with an even luminance distribution by an integrator 19. The luminous flux is colored via a color wheel 20 and totally reflected by a mirror 21. The micromirror element 16 is irradiated with the luminous flux.

Reflected light from the micromirror element forms a light image. The light image formed is projected and displayed, via a projection lens unit 22, on a screen (not shown in the drawings) serving as a projection target.

In the LED array 17, plural groups, for example, five groups of LEDs are controllably driven by a white (W) driver 23 so as to emit light.

The white driver 23 drives the individual LED groups making up the LED array 17, using timings and driving currents based on control signals provided by a projection light processing section 24.

The projection light processing section 24 controls light emission timings and driving currents for the white driver 23 in accordance with image data projection timing signals provided by the projection image processing section 24.

Moreover, the projection light processing section 24 not only supplies power to a motor (M) 25 rotating the color wheel 20 but also receives detection signals from a marker 26 located opposite a rotating circumferential end of the color wheel 20.

All of the operation of each circuit described above is controlled by CPU 27. CPU 27 performs control operations in the data projection apparatus 10 using a main memory 28 composed of DRAM and a program memory 29 made up of an electrically rewritable nonvolatile memory storing operation programs and various fixed data.

CPU 27 performs various projection operations in response to key operation signals from an operation section 30. The operation section 30 includes a key operation section provided on the main body of the data projection apparatus 10, and a laser light receiving section receiving infrared light from a remote controller (not shown in the drawings) dedicated for the data projection apparatus 10. The operation section 30 outputs key operation signals based on keys operated by a user directly or via the remote controller, directly to CPU 27.

CPU 27 is further connected to an audio processing section 31 and a wireless LAN interface 32 via the system bus SB.

The audio processing section 31 includes a sound source circuit such as a PCM sound source. The audio processing section 31 converts audio data provided during a projection operation into analog data, to drive a speaker section 33 for sound reinforcement and emission or generates a beep or the like as required.

The wireless LAN interface 32 transmits and receives data, via a wireless LAN antenna 34, to and from a plurality of external apparatuses including a personal computer, using radio signals in the 2.4 GHz band in conformity with, for example, the IEEE 802.11g standards.

Now, the operation of the above-described embodiment will be described.

In the present embodiment, as described above, the LED array 17 is divided into a plurality of, for example, five LED groups so that lighting timings for the respective LED groups are controlled. In this case, when the LED array 17 is divided into the plurality of LED groups, it is desirable to, instead of orderly placing the arrayed LED groups in the five respective areas so that the groups do not overlap one another, arrange the LED groups so that the individual LEDs making up each of the LED groups are distributed as widely as possible, by mixing the five LED groups over as wide a range as possible so that adjacent LEDs belong to different groups. This allows light emitted by each of the LED groups to be formed into an even, proportionate luminous flux.

Figure 2:
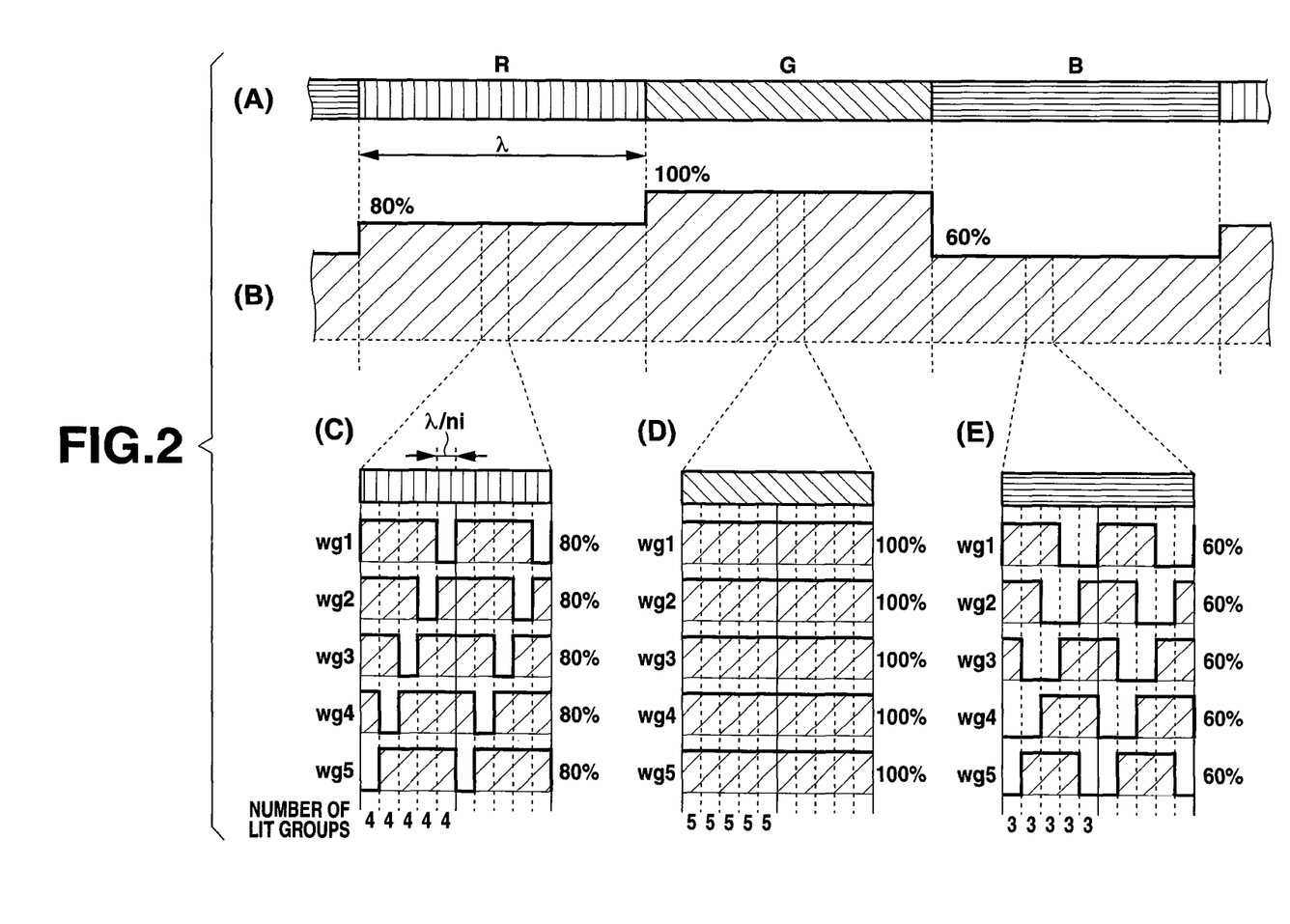
FIG. 2 is a diagram showing an example of how dimming is performed by a sequentially driven light source according to the first embodiment.

FIG. 2 shows how the emission luminance of the LED array 17 while the color wheel 20 makes one rotation on the optical axis of the light source. The color wheel 20 has color filters for primary colors, for example, red (R), green (G), and blue (B) arranged like fans each of which has a center angle of 120° and which correspond to respective three divisions of the rotating circumference. The color filter 20 allows white light having exited the integrator 19 to pass through and is thus colored in one of red, green, and blue (to be exact, only light of the corresponding color component is transmitted). The micromirror element 16 then forms a color image of the corresponding color.

FIG. 2(A) shows projection timings for each color image associated with the rotation of the color wheel 20. FIG. 2(B) shows the emission luminance of the LED array 17 obtained in synchronism with the projection timings. The unit of the projection period of a color image of each color component is defined as λ as shown in FIG. 2.

In the present embodiment, a case is illustrated where the number of light emitting diodes emitting light is adjusted so that the luminance is 80% of a rated value for projection of a red image, is equal to the rated value, that is, 100% of the rated value, for projection of a green image, and is 60% of the rated value for projection of a blue image.

FIGS. 2(C) to 2(E) show how the LED array 17 is driven for each color image. Here, as described above, the LED array 17 is assumed to be composed of a total of five LED groups wg1 to wg5.

In FIG. 2(C), to allow the LED array 17 as a whole to provide an 80% luminance, four of the five LED groups wg1 to wg5 are driven by pulse width modulation with a predetermined phase difference so as to always emit light with an emission luminance accounting for 100% of the rated value.

Here, when the number of LED groups and any positive integral number are defined as n and i, respectively, the above-described phase difference pd can be expressed by:

$$pd = \lambda/(n \cdot i)$$

The above-described integer (i) is as large as possible within a scope permitted by the functions of the projection light processing section 24 and the W driver 23. This allows the five LED groups wg1 to wg5 to emit more averaged light.

In FIG. 2(D), to allow the LED array 17 as a whole to provide a 100% luminance, all of the five LED groups wg1 to wg5 are driven by pulse width modulation with a predetermined phase difference so as to emit light with an emission luminance accounting for 100% of the rated value. However, since all of the five LED groups wg1 to wg5 are selected to emit light, all of the LED groups wg1 to wg5 are always lit during the period λ.

In FIG. 2(E), to allow the LED array to provide a 60% luminance, three of the five LED groups wg1 to wg5 are driven by pulse width modulation with a predetermined phase difference so as to always emit light with an emission luminance accounting for 100% of the rated value.

As described above, with the phase difference set in association with the number of the LED groups, the LED groups are driven by pulse width modulation so as to emit light. Then, the lit LEDs are always driven by a current accounting for 100% of a corresponding rated value. Consequently, a sufficient response speed can be achieved.

In addition, the LED groups are cyclically controllably turned on and off according to the above-described phase difference. The number of LED groups lit at each point in time is kept constant. This prevents light emission duration from being disproportionate among the LED groups. This allows operating time to be averaged.

As described above, according to the present embodiment, if a plurality of high-luminance white LEDs are used as light emitting elements for a light source, the LEDs can be efficiently driven to improve the quality of projection images and increase the lifetimes of all the light emitting elements.

In the above-described embodiment, the LED array 17 is composed of a plurality of, for example, five LED groups. However, the present invention is not limited to this aspect. Provided that the LED array has a plurality of, for example, at least two light emitting elements, the LED array can be similarly controlled because the light emission luminance can be varied between two stages, that is, 100% and 50%.

<Second Embodiment>

A second embodiment in which the present invention is applied to a data projection apparatus will be described with reference to the drawings.

Figure 3:
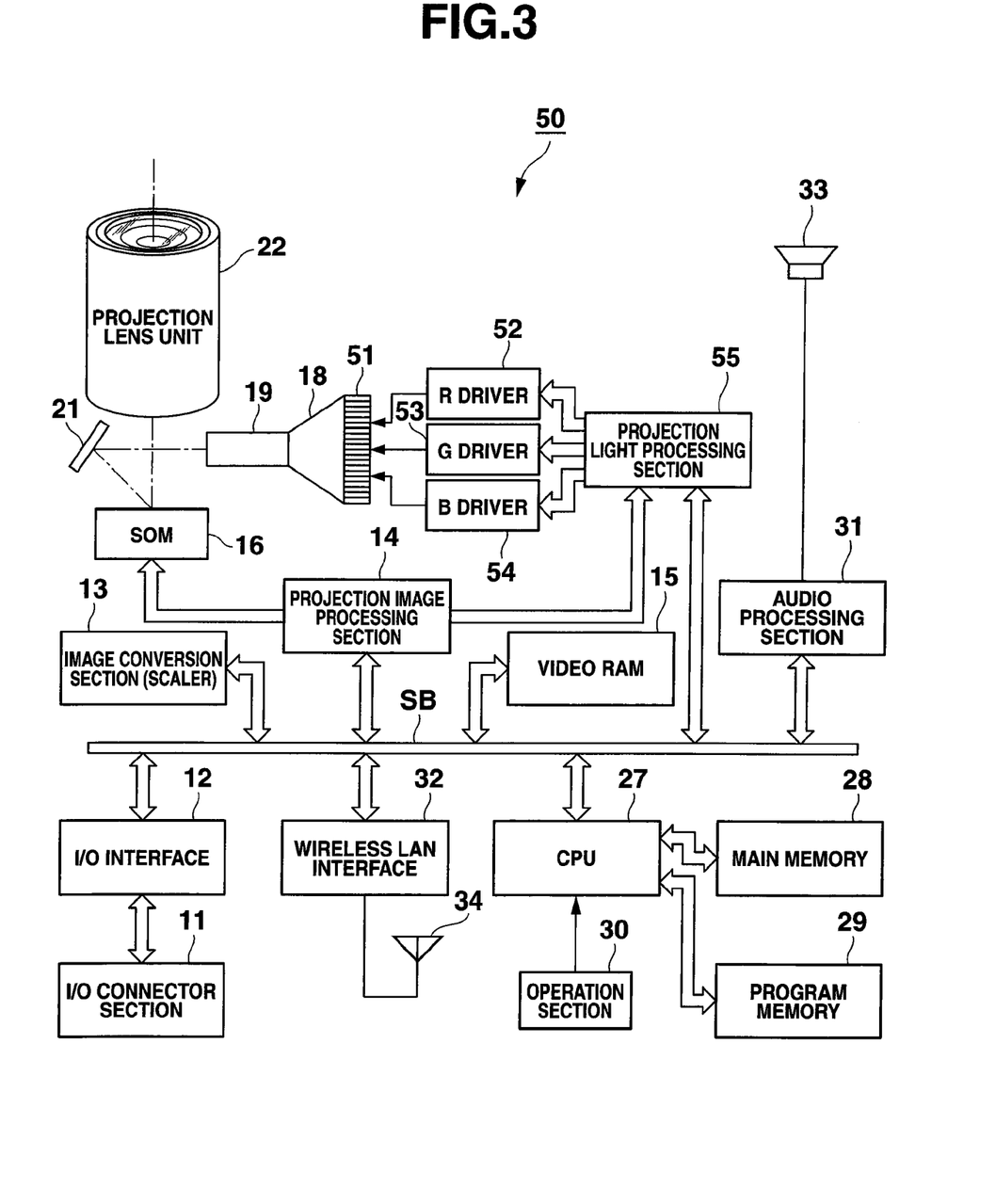
FIG. 3 is a block diagram showing a general functional configuration of an electronic circuit in a data projection apparatus according to a second embodiment of the present invention.

FIG. 3 is a block diagram showing a general functional configuration of an electronic circuit provided in a data projection apparatus 50 according to the present embodiment. Many of the components of the data projection apparatus 50 according to the present embodiment except a light source system are basically configured similarly to the corresponding ones of the data projection apparatus 10 shown in FIG. 1. Thus, the same components are denoted by the same reference numbers and will not be described.

A LED array 51 is used as a light source for the present data projection apparatus 50. The LED array 51 is composed of a large number of regularly and mixedly arrayed LEDs emitting red, green, and blue light. Light of each color component emitted by the LED array 51 sequentially is focused by a pyramidal housing 18 with a reflection mirror stuck all over the inner surface of the housing 18. The light is then changed to a luminous flux with an even luminance distribution by an integrator 19. The luminous flux is totally reflected by a mirror 21. A micromirror element 16 is irradiated with the luminous flux.

In the LED array 51, a red (R) driver 52, a green (G) driver 53, and a blue (B) driver 54 controllably drives the LED groups for the corresponding colors, which thus emit light in the primary colors, red, green, and blue.

The red driver 52, the green driver 53, and the blue driver 54 drive the LED groups for the individual color components making up the LED array 51 using timings and driving currents based on control signals from a projection light processing section 55.

The projection light processing section 55 controls the light emission timings and driving currents provided by the red driver 52, the green driver 53, and the blue driver 54 in accordance with image data provided by a projection image processing section 14.

The operation of the above-described embodiment will be described. In the present embodiment, as described above, the LED array 51 is divided into a plurality of, for example, five LED groups for the respective color components so that lighting timings for the respective LED groups are controlled. In this case, when the LED array 17 is divided into the plurality of LED groups for the respective colors, red, green, and blue, it is desirable to, instead of orderly placing the arrayed LED groups in the five respective areas so that the groups do not overlap one another, arrange the LED groups so that the individual LEDs making up each of the LED groups are distributed as widely as possible, by mixing the five LED groups over as wide a range as possible so that even adjacent LEDs in the same color belong to different groups. This allows light emitted by each of the LED groups to be formed into an even, proportionate luminous flux.

Figure 4:
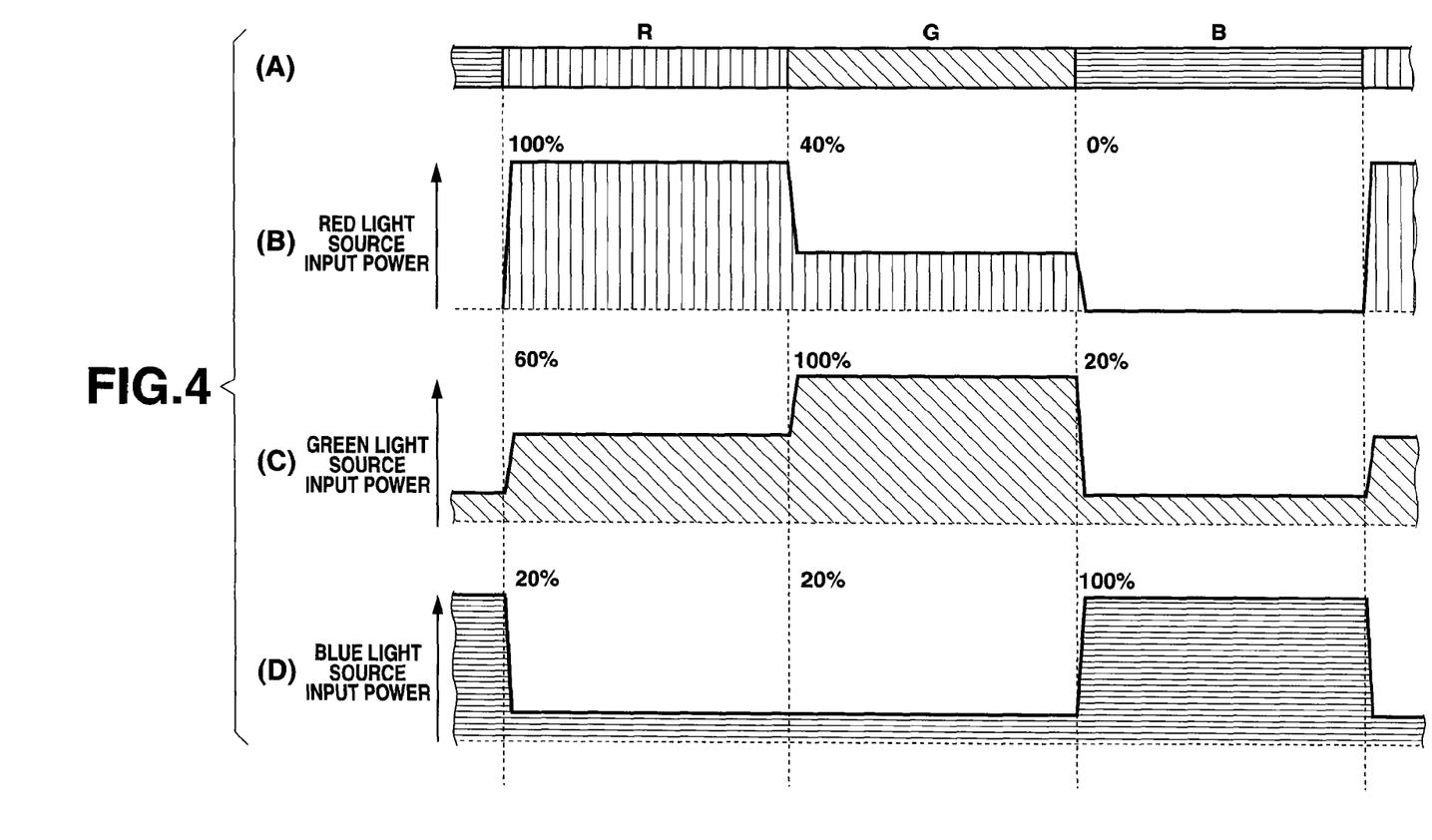
FIG. 4 is a diagram showing an example of how dimming is performed by a sequentially driven light source according to the second embodiment.

FIG. 4 shows how the emission luminance of the LED array 51 is controlled while one frame of color images is being projected. FIG. 4(A) shows display timings for a red image, green image, and blue image formed by the micromirror element 16. FIG. 4(B) shows the emission luminance of the red LED group obtained in synchronism with the timings shown in FIG. 4(A). FIG. 4(C) shows the emission luminance of the green LED group obtained in synchronism with the timings shown in FIG. 4(A). FIG. 4(D) shows the emission luminance of the blue LED group obtained in synchronism with the timings shown in FIG. 4(A).

As shown in the figures, for example, during an original red image projection period, the red LED group is driven so as to emit light with a 100% luminance, while the green LED group is driven so as to emit light with a 60% luminance, and the blue LED group is driven so as to emit light with a 20% luminance.

This is because if the red LED group belonging to the LED array 51 as a product cannot emit light in red, which is an ideal wave band characteristic, the green LED group and the blue LED group are simultaneously driven so as to emit light limitedly with the wave band characteristics of the green LED and blue LED groups taken into account. This improves color rendering properties.

Similarly, during an original green image projection period, the green LED group is driven so as to emit light with a 100% luminance, while the red LED group is driven so as to emit light with a 40% luminance, and the blue LED group is driven so as to emit light with a 20% luminance.

Furthermore, during an original blue image projection period, the blue LED group is driven so as to emit light with a 100% luminance, while the green LED group is driven so as to emit light with a 20% luminance.

Figure 5:
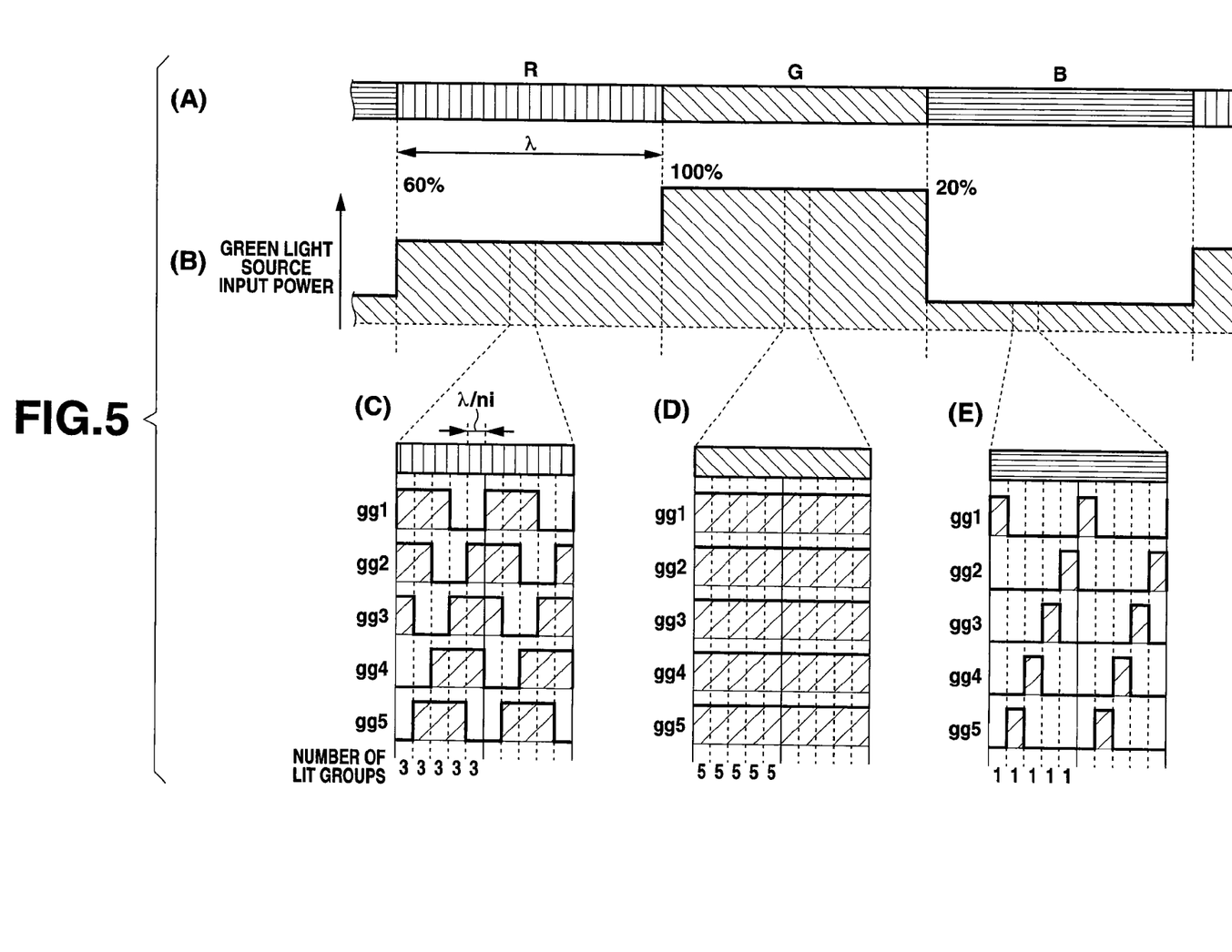
FIG. 5 is a diagram showing the example of how dimming is performed by the sequentially driven light source according to the second embodiment.

FIG. 5 shows a specific example of how the green LED group belonging to the LED array 51 is controllably driven so as to emit light as also described above with reference to FIG. 4(C). The basic concept of the control is the same as that described with reference to FIG. 4(C) and also applied to the red LED and blue LED groups belonging to the LED array 51.

In association with the projection periods of the red, green, and blue images in FIG. 5(A), the green LED group is cyclically controllably driven so as to emit light with a 60% luminance, a 100% luminance, and a 20% luminance as shown in FIG. 5(B). The unit of the projection period of a color image of each color component is defined as λ as shown in FIG. 5.

FIGS. 5(C) to 5(E) show how the green LED group is driven for each color image by the green driver 53. Here, the green LED group is assumed to be composed of a total of five LED groups gg1 to gg5.

In FIG. 5(C), to allow the LED array 51 as a whole to provide a 60% luminance, three of the five LED groups gg1 to gg5 are driven by pulse width modulation with a predetermined phase difference so as to always emit light with an emission luminance accounting for 100% of the rated value.

Here, when the number of LED groups and any positive integral number are defined as n and i, respectively, the above-described phase difference pd can be expressed by:

$$pd=\lambda/(n \cdot i)$$

The above-described integer (i) is as large as possible within a scope permitted by the functions of the projection light processing section 55 and the green driver 53 (this also applies to the red driver 52 and the blue driver 54). This allows the five LED groups gg1 to gg5 to emit more averaged light.

In FIG. 5(D), to allow the LED array as a whole to provide a 100% luminance, all of the five LED groups gg1 to gg5 are driven by pulse width modulation with a predetermined phase difference so as to emit light with an emission luminance accounting for 100% of the rated value. However, since all of the five LED groups gg1 to gg5 are selected to emit light, all of the LED groups gg1 to gg5 are always lit during the period λ.

In FIG. 5(E), to allow the LED array 51 as a whole to provide a 20% luminance, one of the five LED groups gg1 to gg5 is driven by pulse width modulation with a predetermined phase difference so as to always emit light with an emission luminance accounting for 100% of the rated value.

As described above, with the phase difference set in association with the number of the LED groups, the LED groups are driven by pulse width modulation so as to emit light. Then, the lit LEDs are always driven by a current accounting for 100% of a corresponding rated value. Consequently, a sufficient response speed can be achieved.

In addition, the LED groups are cyclically controllably turned on and off according to the above-described phase difference. The number of LED groups lit at each point in time is kept constant. This prevents the light emission duration from being disproportionate among the LED groups. This allows the operating time to be averaged.

Now, another example of the operation of the above-described embodiment will be described with reference to the drawings.

In the present example of the operation, the LED array 51 is divided into a plurality of, for example, five LED groups for the respective color components so that lighting timings for the respective LED groups are controlled. In this case, when the LED array 51 is divided into the plurality of LED groups for the respective colors, red, green, and blue, it is desirable to, instead of orderly placing the arrayed LED groups in the five respective areas so that the groups do not overlap one another, arrange the LED groups so that the individual LEDs making up each of the LED groups are distributed as widely as possible, by mixing the five LED groups over as wide a range as possible so that even adjacent LEDs in the same color belong to different groups. This allows light emitted by each of the LED groups to be formed into an even, proportionate luminous flux.

Figure 6:
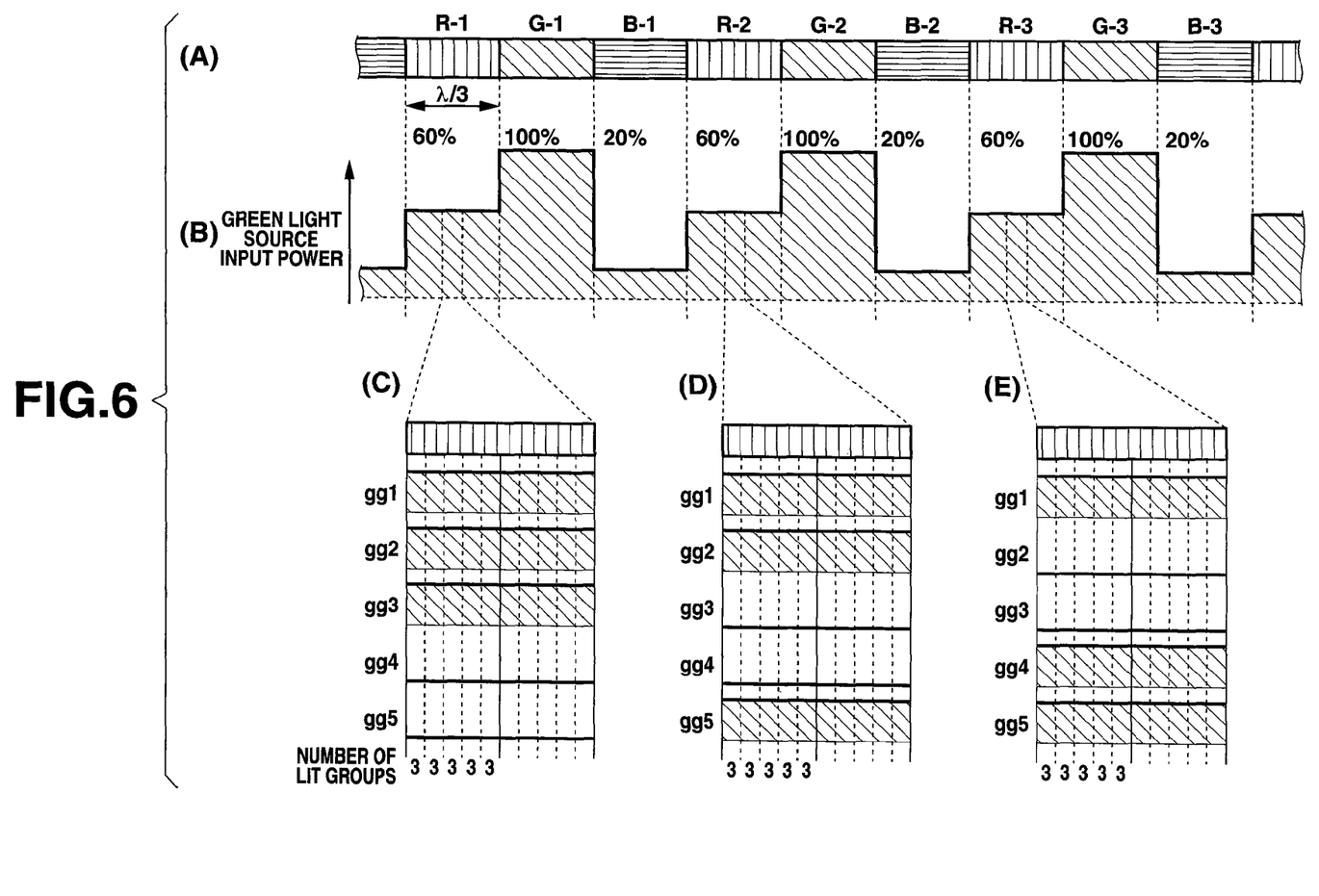
FIG. 6 is a diagram showing another example of how dimming is performed by the sequentially driven light source according to the second embodiment.

FIG. 6 shows the emission luminance particularly of the green LED group in the LED array 51. The ratio of the emission luminances of the green LED, red LED, and blue LED groups itself is similar to that shown in FIG. 4 described above. That is, the green LED group is driven by the projection light processing section 55 and the green driver 53 so as to emit light with a 60% luminance, a 100% luminance, and a 20% luminance in synchronism with the display timings for a red image, a green image, and a blue image formed by the micromirror element 16.

For display, one frame of color image as a whole is divided into nine periods of the respective fields. Each of the projection periods of red, green, and blue is cyclically arranged three times so that the same red, green, or blue image is repeatedly projected three times.

In association with the projection periods of the red, green, and blue images in FIG. 6(A), the green LED group is cyclically controllably driven so as to emit light with a 60% luminance, a 100% luminance, and a 20% luminance as shown in FIG. 6(B). The unit of the projection period of a color image of each color component is defined as $\lambda/3$.

FIGS. 6(C) to 6(E) show how the green LED group is driven by the green driver 53 during each of three projections of an red image while one frame of color image is being projected. Here, the green LED group is assumed to be composed of a total of five LED groups gg1 to gg5.

In FIG. 6(C), to allow the LED array 51 to provide a 60% luminance during the first red image projection period R1, three of the five LED groups gg1 to gg5, particularly the first to third LED groups gg1 to gg3, are driven by pulse width modulation with a predetermined phase difference for the period $\lambda/3$ so as to always emit light with an emission luminance accounting for 100% of the rated value.

In FIG. 6(D), to allow the LED array 51 to provide a 60% luminance also during the second red image projection period R2, three of the five LED groups gg1 to gg5, particularly the first, second, and fifth LED groups gg1, gg2, and gg5, are driven by pulse width modulation with a predetermined phase difference for the period $\lambda/3$ so as to always emit light with an emission luminance accounting for 100% of the rated value.

In FIG. 6(E), to allow the LED array to provide a 60% luminance also during the third red image projection period R3, three of the five LED groups gg1 to gg5, particularly the first, fourth, and fifth LED groups gg1, gg4, and gg5, are driven by pulse width modulation with a predetermined phase difference for the period $\lambda/3$ so as to always emit light with an emission luminance accounting for 100% of the rated value.

Thus, the original red image projection period is divided into three portions, and those of the five LED groups gg1 to gg5 are sequentially switched to average the light emission durations of the LED groups gg1 to gg5.

As described above, light emission driving is performed with appropriate LED groups sequentially selected according to the required emission luminance. Thus, the lit LEDs are driven with a current accounting for 100% of the corresponding rated value.

In addition, the LED groups are driven so as to emit light such that the light emission position is switched in synchronism with each of m, (in the present embodiment, three) equal division periods into which the light emission duration unit for each of the red driver 52, the green driver 53, and the blue driver 54 is divided (m is a natural number greater than one). This prevents the light emission duration from being disproportionate among the LED groups. Consequently, the operating time can be averaged.

In particular, in the above-described embodiment, the light source for the plurality of colors forming color images is controlled in connection with the luminance required for each color component so as to allow the plurality of colors to be simultaneously subjected to light emission driving; for example, during the original red image projection period, the green and blue colors are subjected to light emission driving simultaneously with the R color. Thus, the color rendering properties can be improved.

<Third Embodiment>

A third embodiment in which the present invention is applied to a data projection apparatus will be described with reference to the drawings.

Figure 7:
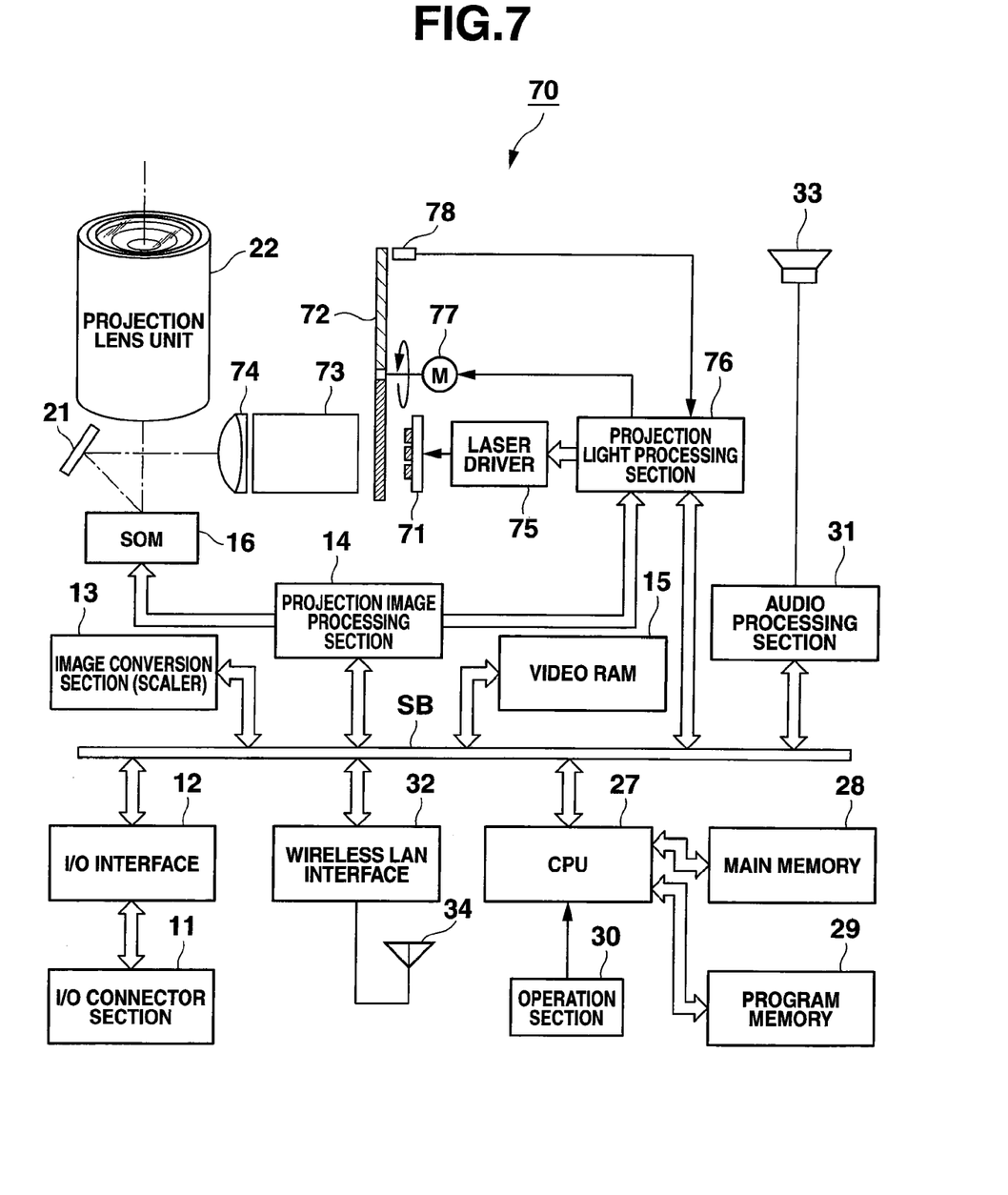
FIG. 7 is a block diagram showing a general functional configuration of an electronic circuit in a data projection apparatus according to a third embodiment of the present invention.

FIG. 7 is a block diagram showing a general functional configuration of an electronic circuit provided in a data projection apparatus 70 according to the present embodiment. Many of the components of the data projection apparatus 70 according to the present embodiment except a light source system are basically configured similarly to the corresponding ones of the data projection apparatus 10 shown in FIG. 1. Thus, the same components are denoted by the same reference numbers and will not be described.

A semiconductor laser array 71 is used as a light source for the present data projection apparatus 70. The semiconductor laser array 71 is composed of a plurality of, for example, five arrayed semiconductor lasers oscillating at the frequency of blue (B) light. FIG. 7 is a simplified diagram showing the configuration of the semiconductor laser array 71 as viewed from the side of the array 71. By arranging four semiconductor lasers at an equal distance, on the left, right, top, and bottom, respectively, from one different semiconductor laser as viewed from the front of the array 71, the array can be composed of a total of five closely-arranged semiconductor lasers.

A plurality of single-color laser beams oscillating the semiconductor laser array 71 are appropriately colored by a rotating fluorescent color wheel 72. The laser beams are then changed to a luminous flux with an even luminance distribution by an integrator 73. The laser beams are subsequently focused by a light source-side lens system 74 and then totally reflected by a mirror 21. The micromirror element 16 is then irradiated with the laser beams.

The fluorescent color wheel 72 is composed of a total of three fan-shaped color filters dividing the circumference on a disc and including a transparent filter made up of, for example, colorless diffusion glass, an red fluorescent filter coated with a red fluophor, and a green fluorescent filter coated with a green fluophor. A motor 25 drivingly rotates the fluorescent color wheel 72 so that a plurality of points on the circumference of the fluorescent color wheel 72 are irradiated with the respective blue laser beams from the semiconductor laser array 71.

The transparent filter allows the blue laser beams to pass through while diffusing the laser beams. The red fluorescent filter is irradiated with the blue laser beams to excite and emit red fluorescence from a surface located opposite an incident surface while diffusing the fluorescence. Likewise, the green fluorescent filter is irradiated with the blue laser beams to excite and emit green fluorescence from a surface located opposite an incident surface while diffusing the fluorescence.

Thus, the fluorescent color wheel 72 rotates to allow light in the primary colors, red, green, and blue to be emitted sequentially. The micromirror element 16 is then irradiated with the light via the integrator 73, the light source side lens system 74, and the mirror 21.

The semiconductor laser array 71 is individually drivingly oscillated by a laser driver 75. The laser driver 75 drives the individual semiconductor lasers making up the semiconductor laser array 71, using timings and driving currents based on control signals from a projection light processing section 76.

The projection light processing section 76 controls the light emission timings and driving currents provided by the laser driver 75 in accordance with image data provided by a projection image processing section 14. Furthermore, the projection light processing section 76 not only supplies power to a motor (M) 77 rotating the fluorescent color wheel 72 but also receives detection signals from a marker 78 located opposite a rotating circumferential end of the fluorescent color wheel 72 for synchronous detection.

Now, the operation of the above-described embodiment will be described. In the present embodiment, lighting timings for the semiconductor laser array 71 are controlled as described above.

Figure 8:
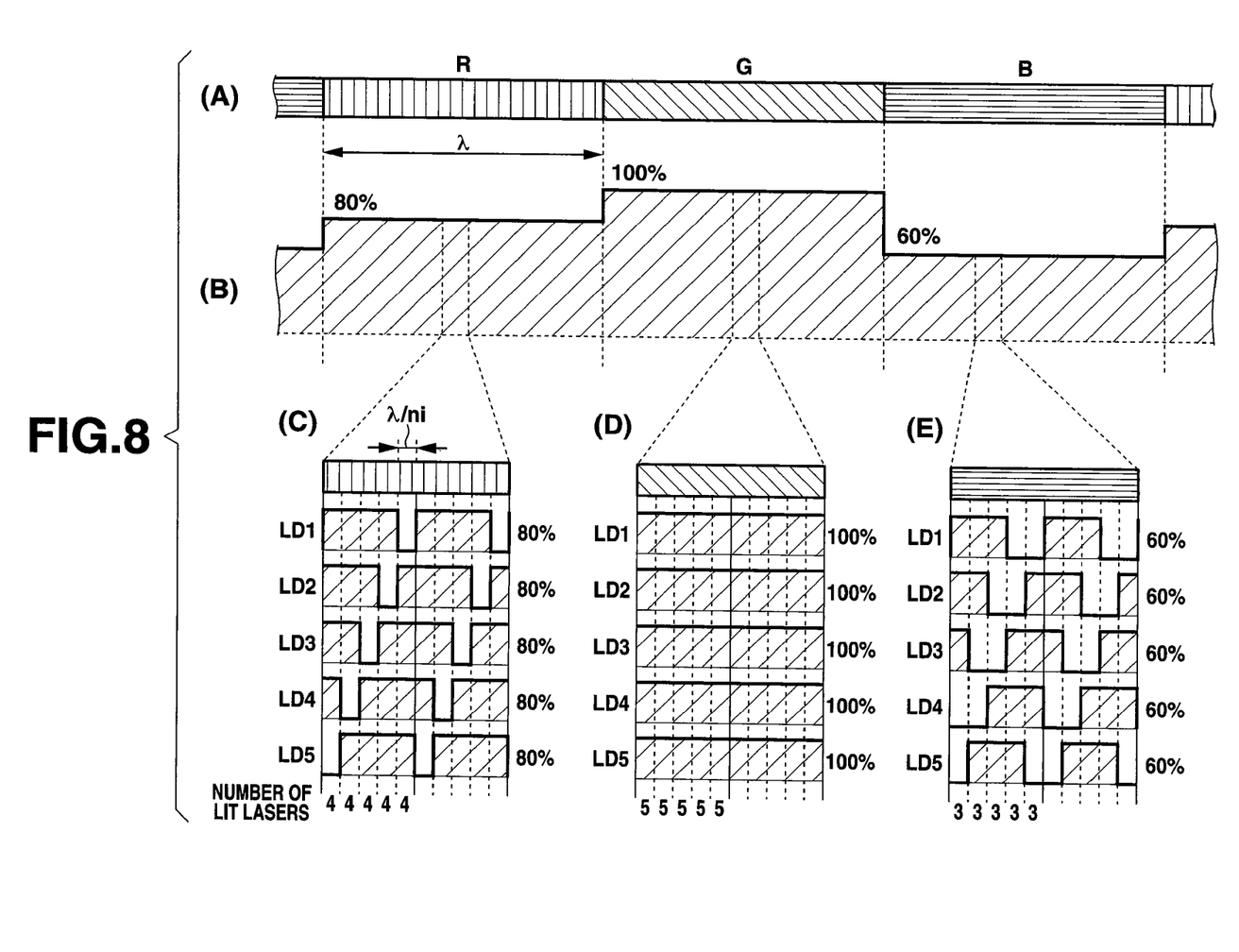
FIG. 8 is a diagram showing an example of how dimming is performed by a sequentially driven light source according to the third embodiment.

FIG. 8 shows how the emission luminance of the semiconductor laser array 71 as a whole while the fluorescent color wheel 72 making one rotation on the optical axis of the light source. As described above, in the fluorescent color wheel 72, the red (R) fluorescent filter, the green (G) fluorescent filter, and blue (B) transparent diffusion filter are arranged like fans each of which has a center angle of 120 degrees and which correspond to respective three divisions of the rotating circumference. When the fluorescent color wheel 72 is irradiated with blue laser light output by the semiconductor laser array 71, red light and green light, resulting from the excited corresponding phosphors, and blue light, that is, transmitted light, are emitted sequentially while being dispersed. The micromirror element 16 thus forms a color image of the corresponding color.

FIG. 8(A) shows projection timings for each color image associated with the rotation of the fluorescent color wheel 72. FIG. 8(B) shows the emission luminance of the semiconductor laser array 71 obtained in synchronism with the projection timings. The unit of the projection period of a color image of each color component is defined as λ as shown in FIG. 8.

In the present embodiment, a case is illustrated where dimming is performed on the basis of the number of semiconductor lasers emitting light so that the luminance is 80% of a rated value for projection of an red image, is equal to the rated value, that is, 100% of the rated value, for projection of a green image, and is 60% of the rated value for projection of a blue image.

FIGS. 8(C) to 8(E) show how the semiconductor laser array 71 is driven for each color image. Here, as described above, the semiconductor laser array 71 is assumed to be composed of a total of five semiconductor lasers LD1 to LD5.

In FIG. 8(C), to allow the semiconductor laser array 71 to provide an 80% luminance, four of the five semiconductor lasers LD1 to LD5 are driven by pulse width modulation with a predetermined phase difference so as to always emit light with an emission luminance accounting for 100% of the rated value.

Here, when the number of semiconductor lasers and any positive integral number are defined as n and i, respectively, the above-described phase difference pd can be expressed by:

$$pd=\lambda/(n \cdot i)$$

The above-described integer (i) is as large as possible within a scope permitted by the functions of the projection light processing section 76 and the laser driver 75. This allows the five semiconductor lasers LD1 to LD5 to emit more averaged light.

In FIG. 8(D), to allow the semiconductor laser array 71 to provide a 100% luminance, all of the five semiconductor lasers LD1 to LD5 are driven by pulse width modulation with a predetermined phase difference so as to emit light with an emission luminance accounting for 100% of the rated value. However, since all of the five semiconductor lasers LD1 to LD5 are selected to emit light, all of the semiconductor lasers LD1 to LD5 are always lit during the period λ.

In FIG. 8(E), to allow the semiconductor laser array 71 to provide a 60% luminance, three of the five semiconductor lasers LD1 to LD5 are driven by pulse width modulation with a predetermined phase difference so as to always emit light with an emission luminance accounting for 100% of the rated value.

As described above, with the phase difference set in association with the number of the semiconductor lasers, the semiconductor lasers are driven by pulse width modulation so as to emit light. Then, the lit semiconductor lasers are always driven by a current accounting for 100% of a corresponding rated value. Consequently, a sufficient response speed can be achieved.

In addition, the semiconductor lasers LD1 to LD5 are cyclically controllably turned on and off according to the above-described phase difference. The number of semiconductor lasers lit at each point in time is kept constant. This prevents the light emission duration from being disproportionate among the semiconductor laser. This allows the operating time to be averaged.

As described above in detail, according to the present embodiment, if a plurality of semiconductor lasers are used as light emitting elements for a light source, the semiconductor lasers can be efficiently driven to improve the quality of projection images and increase the lifetimes of all the light emitting elements.

Additionally, even if the emission luminance varies among the plurality of semiconductor lasers because of individual differences, the above-described driving method allows the individual differences to be absorbed to uniformize the luminance. This enables the quality of projection images to be kept constant. In the description of the third embodiment, the present invention is applied to the semiconductor lasers. However, the present invention is not limited to this aspect but is similarly applicable to a second harmonic generation (SHG) laser, a gas laser, or the like.

In the description of each of the first to third embodiments, the present invention is applied to the data projection apparatus. However, the present invention is not limited to this aspect but is similarly applicable to a projection apparatus using a plurality of light emitting elements such as LEDs or semiconductor lasers or a rear projection television receiver using such a projection apparatus.

The present invention is not limited to the above-described embodiments. In practice, many variations may be made to the embodiments without departing from the scope of the present invention. Furthermore, the functions executed in the above-described embodiments may be appropriately combined together if possible. Each of the above-described embodiments includes various stages. Various inventions can thus be extracted by appropriately combining a plurality of the disclosed components. For example, if the embodiment from which some of the components shown in the embodiment are deleted is still effective, the configuration from which the components have been deleted can be extracted as an invention.

What is claimed is:

1. A projection apparatus which projects images of respective color components sequentially by time division, the projection apparatus comprising:
a light source section comprising k×n color light emitting elements such that n color light emitting elements are provided for each of k colors forming a color image (where n is a natural number greater than one, and k is a natural number greater than two); and
a driving control section which drives the color light emitting elements to emit light simultaneously in at least two of the k colors, wherein one of the at least two colors is a main color, and the other at least one color is a supplementary color;
wherein the driving control section drives each of the n light emitting elements of the supplementary color by a pulse width modulation scheme based on a phase difference of $\lambda/(n \cdot i)$ (where $\lambda$ is a lighting period unit and i is a natural number greater than one), in synchronism with a projection period unit of the image of each color component.

2. The projection apparatus according to claim 1, wherein the at least one supplementary color is emitted with a lower luminance than the main color.

3. The projection apparatus according to claim 1, wherein the driving control section drives the color light emitting elements to emit light simultaneously in at least the main color and two supplementary colors such that the supplementary colors are emitted with different luminances.

4. The projection apparatus according to claim 1, wherein each of the n light emitting elements is a group of light emitting diodes.

5. The projection apparatus according to claim 1, wherein each of the n light emitting elements is a laser.

6. A method of driving a projection apparatus which projects images of respective color components sequentially by time division, wherein the projection apparatus includes a light source section comprising k×n color light emitting elements such that n color light emitting elements are provided for each of k colors forming a color image (where n is a natural number greater than one, and k is a natural number greater than two), the projection method comprising:
driving the color light emitting elements to emit light simultaneously in at least two of the k colors, wherein one of the at least two colors is a main color, and the other at least one color is a supplementary color;
wherein the driving comprises driving each of the n light emitting elements of the supplementary color by a pulse width modulation scheme based on a phase difference of $\lambda/(n \cdot i)$ (where $\lambda$ is a lighting period unit and i is a natural number greater than one), in synchronism with a projection period unit of the image of each color component.

7. The method according to claim 6, wherein the at least one supplementary color is emitted with a lower luminance than the main color.

8. The method according to claim 6, wherein the driving comprises driving the color light emitting elements to emit light simultaneously in at least the main color and two supplementary colors such that the supplementary colors are emitted with different luminances.

9. The method according to claim 6, wherein each of the n light emitting elements is a group of light emitting diodes.

10. The method according to claim 6, wherein each of the n light emitting elements is a laser.

* * * * *